United States Patent
Kwan et al.

(10) Patent No.: US 7,843,825 B2
(45) Date of Patent: Nov. 30, 2010

(54) METHOD AND SYSTEM FOR PACKET RATE SHAPING

(75) Inventors: Bruce Kwan, Sunnyvale, CA (US); Chien-Hsien Wu, Cupertino, CA (US); Song-Huo Yu, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 514 days.

(21) Appl. No.: 11/866,098

(22) Filed: Oct. 2, 2007

(65) Prior Publication Data
US 2009/0086634 A1    Apr. 2, 2009

(51) Int. Cl.
*H04L 12/28* (2006.01)
*H04L 12/56* (2006.01)
*G06F 15/16* (2006.01)

(52) U.S. Cl. .................. 370/230.1; 370/235; 370/412; 709/232

(58) Field of Classification Search ...... 370/235–235.1, 370/395.4–395.43; 709/223–225, 232–235
See application file for complete search history.

(56) References Cited

U.S. PATENT DOCUMENTS

| 6,560,195 | B1 * | 5/2003 | Basak et al. ............... 370/230 |
| 7,002,980 | B1 * | 2/2006 | Brewer et al. .............. 370/414 |
| 7,027,394 | B2 * | 4/2006 | Gupta et al. ............. 370/230.1 |
| 7,342,929 | B2 * | 3/2008 | Bremler-Barr et al. ... 370/395.4 |
| 7,529,191 | B2 * | 5/2009 | Smith et al. ................. 370/235 |
| 7,577,096 | B2 * | 8/2009 | Smith et al. ............. 370/235.1 |
| 2002/0075875 | A1 * | 6/2002 | Dravida et al. ......... 370/395.21 |
| 2004/0125815 | A1 * | 7/2004 | Shimazu et al. ............. 370/411 |
| 2007/0153697 | A1 * | 7/2007 | Kwan et al. ................. 370/235 |

\* cited by examiner

*Primary Examiner*—Tri H Phan
(74) *Attorney, Agent, or Firm*—McAndrews, Held & Malloy

(57) ABSTRACT

Aspects of a method and system for packet rate shaping may include an MMU that enables classification of one or more packets based on a CoS and/or an egress port, and transmission of the packets in accordance with a specified packet rate based on the classification.

33 Claims, 4 Drawing Sheets

METHOD AND SYSTEM FOR PACKET RATE SHAPING

CROSS-REFERENCE TO RELATED APPLICATIONS/INCORPORATION BY REFERENCE

This application makes reference to U.S. patent application Ser. No. 11/187,404 filed Jul. 21, 2005, which is hereby incorporated herein by reference in its entirety.

FIELD OF THE INVENTION

Certain embodiments of the invention relate to communication networks. More specifically, certain embodiments of the invention relate to a method and system for packet rate shaping.

BACKGROUND OF THE INVENTION

Data networks have evolved from being single purpose providers of data-centric services such as file transfers and electronic mail, into multiservice platforms that provide traditional data services, voice communications services, and multimedia communication services. As the range of services has expanded, the requirements for data networks have also expanded to accommodate the unique characteristics of the different service types. For example, while file transfers may accommodate variable data rate transmission across the data network, voice communications services may require the allocation of resources within the network to enable constant data rate transmission. In addition, voice communication services may specify a maximum time delay, or latency, between the transmission of one packet, and the transmission of the succeeding packet. While some multimedia communications services may accommodate variable data rate transmission, they typically require the allocation of resources within the network to enable a targeted minimum data transmission rate.

Given that data networks do not have infinite bandwidth, multiservice data networks may be required to provide mechanisms for prioritizing the allocation of network resources among a diverse set of communication services. On such mechanism classifies data traffic carried within a network based on a class of service (CoS). CoS enables data traffic to be classified as belonging to one of a plurality of classes, wherein a class is typically defined according to a traffic profile. For example, one CoS may be characterized by a constant bit rate (CBR) traffic profile, where the quantitative constant data transfer rate may be a part of the traffic profile. In some conventional networks, the constant data transfer rate may be specified in bits/second. For CBR traffic, the network may attempt to allocate resources to enable traffic to be transmitted at the specified constant transfer rate. The CBR CoS may be suitable for voice communication traffic.

Another CoS may be characterized by a variable bit rate traffic (VBR) traffic profile, where a quantitative minimum data transfer rate, maximum data transfer rate, and/or burst time may be parts of the traffic profile. In some conventional networks, the minimum and maximum data transfer rates may be specified in bits/second, while the burst time may be specified in seconds. For VBR traffic, the network may attempt to allocate resources to enable traffic to be transmitted at the minimum data transfer rate for a sustained period of time, while enabling traffic to be transmitted at rates between the minimum data transfer rate and the maximum data transfer rate for a period of time, which is at least as long as is specified by the burst time traffic profile parameter. The VBR CoS may be suitable for video communication traffic.

Another CoS may be characterized by an unspecified bit rate (UBR) traffic profile. For UBR traffic, the network may not allocate resource and will transmit such traffic when there are available resources within the network. This is sometimes also referred to as "best effort" delivery of traffic. The UBR CoS may be suitable for file transfers and other traditional data-centric traffic.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for packet rate shaping, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for packet rate shaping. Various embodiments of the invention comprise a method and system by which data packets may be classified, within a switching device that is attached to a network, according to a class of service (CoS), and/or by egress port. The switching device schedules a time for transmission of the data packet to the network via the egress port based on the CoS and/or egress port classification. In various embodiments of the invention, the scheduling of a time for transmission of the data packet, also referred to as traffic shaping, may shape the traffic to achieve a data transfer rate, which may be specified in packets/second.

In various embodiments of the invention, a scheduler within the switching device may determine the scheduled time for transmission by utilizing a leaky bucket algorithm. In this aspect of the invention, the leaky bucket may determine when a data packet is eligible for being transmitted from the egress port. Upon determination of eligibility for transmission by the leaky bucket, the scheduler may determine the time instant at which the data packet may be transmitted. When the leaky bucket count reaches a user-defined maximum threshold value, the egress port may be determined to be ineligible for transmission. The leaky bucket may comprise a number of tokens, which may be evaluated to determine whether the data packet is to be allocated a scheduled time for network transmission. Tokens may be periodically removed from the leaky bucket count. Tokens may be added to the leaky bucket count when data packets are transmitted via the egress port. If the arriving data packet is to be allocated a scheduled time for network transmission, the data packet may be stored in an egress buffer while awaiting an opportunity to be transmitted via the egress port. If the number of tokens in the leaky bucket exceeds a maximum threshold value when the data packet arrives, a scheduled time for network transmission may be denied. The number of tokens may be increased by a specified number of tokens for each arriving data packet. The number of tokens may be decreased, or leaked, at a specified refresh rate as measured in tokens/second, for example.

Figure 1:
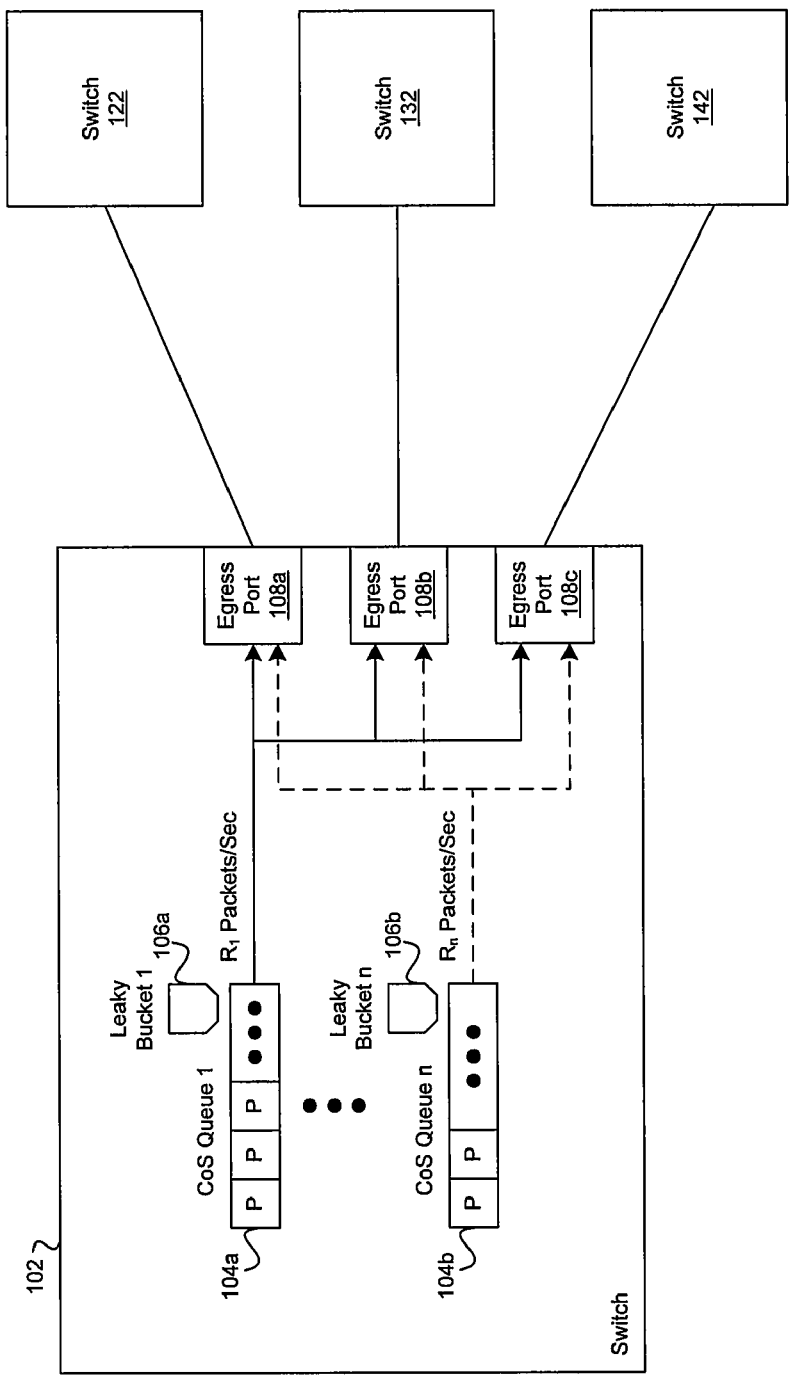
FIG. 1 is a diagram of an exemplary switch utilizing packet rate shaping based on class of service, in accordance with an embodiment of the invention.

FIG. 1 is a diagram of an exemplary switch utilizing packet rate shaping based on class of service, in accordance with an embodiment of the invention. Referring to FIG. 1, there is shown a switch 102, 122, 132 and 142. The switch 102 may comprise a plurality of CoS based queues 104a and 104b, a corresponding plurality of leaky buckets 106a and 106b, and a plurality of egress ports 108a, 108b and 108c.

The switch 102 may transmit data packets to switches 122, 132 and/or 142. The switch 102 may transmit data packets to switch 122 via egress port 108a. The switch 102 may transmit data packets to switch 132 via egress port 108b. The switch 102 may transmit data packets to switch 142 via egress port 108c. Data packets, labeled as "P" in FIG. 1, which are to be routed to one of the egress ports may be classified according to the CoS associated with the data packet. As shown in FIG. 1, the switch 102 may establish n service classes, for example, 1-n, wherein each service class may have an associated CoS Queue 104a or 104b. Once a data packet has been classified into a given service class, the data packet may be stored in the corresponding CoS queue. The switch 102 may schedule the data packet for transmission via one of the egress ports 108a, 108b and/or 108c based on the CoS.

The rate at which the switch 102 retrieves a data packet from a given CoS queue, and outputs the packet via one of the egress ports 108a, 108b and/or 108c, may depend upon one or more traffic profile parameters associated with the queue. For example, the switch 102 may retrieve data packets from the CoS Queue 104a at a rate of $R_1$ packets/sec. Similarly, the switch 102 may retrieve data packets from the CoS Queue 104b at a rate of $R_n$ packets/sec. The switch 102 may determine which egress port is to receive a retrieve data packet based on data contained within the retrieved data packet.

The switch 102 may determine a scheduled time for retrieving the data packet from a given CoS queue based on the leaky bucket associated with the CoS queue. For example, the leaky bucket 106a may be associated with the CoS queue 104a. The leaky bucket 106a enables enforcement of the traffic profile parameters associated with the service class by maintaining a token count. For example, when a data packet arrives at the CoS Queue 104a, the switch 102 may determine the token count value associated with the leaky bucket 106a. If the current token count value is less than or equal to a configurable maximum token count value, the data packet may be stored in the CoS Queue 104a to be scheduled for transmission via one of the egress ports 108a, 108b and/or 108c. When a data packet is transmitted from the CoS Queue 104a, the token count value in the leaky bucket 106a may be increased by a specified number of token. In an exemplary embodiment of the invention, the token count value stored in the leaky bucket 106a may be increased by a specified number of tokens for each data packet that is transmitted from the CoS Queue 104a. The configurable maximum token count value may be specified with a minimum granularity value, and with a maximum token count value. In various embodiments of the invention, the ability of the token bucket 106a to utilize the configurable maximum token count value for traffic shaping may be disabled.

The leaky bucket 106a may also decrease the token count value at a specified rate. This process, referred to as "refresh", may determine how many tokens are to be removed from the token bucket 106a at specified time intervals. In an exemplary embodiment of the invention, the refresh rate may specify the number of tokens to remove from the token bucket 106a for each time duration, which is approximately equal to the specified time interval. The refresh rate may be specified with a minimum granularity equal to the number of tokens corresponding to a single data packet. For example, a refresh rate of 1 may correspond to removing a number of tokens corresponding to 1 data packet from the token bucket 106a for each 1 second time interval.

In various embodiments of the invention, the instantaneous data rate at which data packets may be retrieved from the CoS Queue 104a and sent to the egress ports 108a, 108b and/or 108c may be determined based on the configurable maximum token count value and the refresh rate parameters associated with the leaky bucket 106a.

The description for the CoS Queue 104b and leaky bucket 106b may be substantially similar to the description of CoS Queue 104a and leaky bucket 106a, respectively. Each CoS queue and leaky bucket may be independently configured for each distinct service class.

Figure 2:
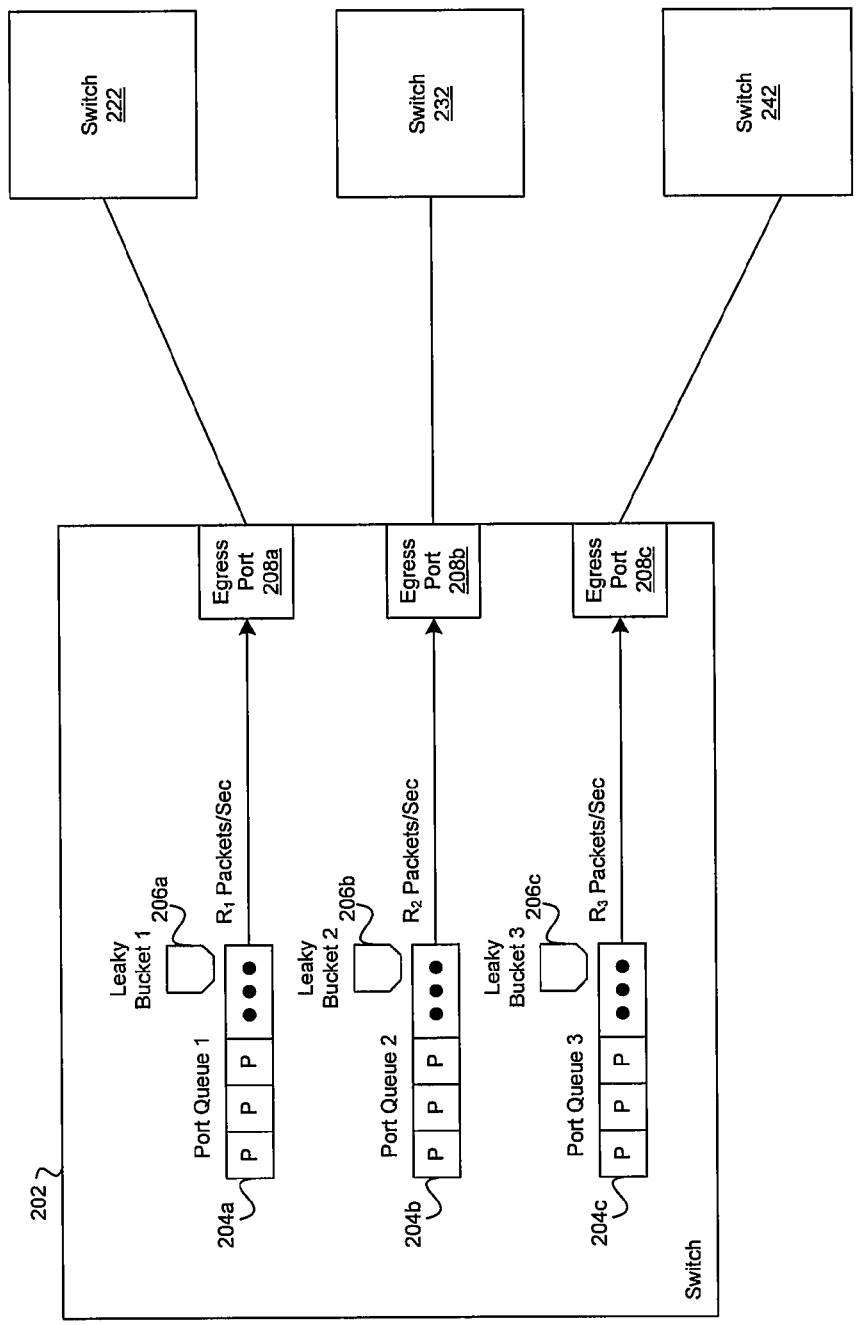
FIG. 2 is a diagram of an exemplary switch utilizing packet rate shaping based on egress port, in accordance with an embodiment of the invention.

FIG. 2 is a diagram of an exemplary switch utilizing packet rate shaping based on egress port, in accordance with an embodiment of the invention. Referring to FIG. 1, there is shown a switch 202, 222, 232 and 242. The switch 202 may comprise a plurality of port based queues 204a, 204b and 204c, a corresponding plurality of leaky buckets 206a, 206b and 206c, and a plurality of egress ports 208a, 208b and 208c.

The switch 202 may transmit data packets to switches 222, 232 and/or 242. The switch 202 may transmit data packets to switch 222 via egress port 208a. The switch 202 may transmit data packets to switch 232 via egress port 208b. The switch 202 may transmit data packets to switch 242 via egress port 208c. Data packets, labeled as "P" in FIG. 2, may be classified according to the egress port, which may be utilized for transmitting the data packet. As shown in FIG. 2, the switch 202 may establish may establish a port queue for each egress port. For example port queue 204a may be utilized for storage of data packets, which may be transmitted via egress port 208a, port queue 204b may be utilized for storage of data packets, which may be transmitted via egress port 208b and port queue 204c may be utilized for storage of data packets, which may be transmitted via egress port 208c. Once a data packet has been stored in the port queue, the switch 202 may schedule the data packet for transmission via the corresponding egress port.

The rate at which the switch 202 retrieves a data packet from a given port queue, and outputs the packet via the corresponding egress port, may depend upon one or more traffic profile parameters associated with the queue. For example, the switch 202 may enable output of data packets via the egress port 208a at a rate of $R_1$ packets/sec. Similarly, the switch 202 may enable output of data packets via the egress port 208b at a rate of $R_2$ packets/sec, while enabling output of data packets via the egress port 208c at a rate of $R_3$ packets/sec. The switch 202 may determine into which port queue to classify a data packet based on data contained within the retrieved data packet.

The switch 202 may determine a scheduled time for retrieving the data packet from a given port queue based on the leaky bucket associated with the port queue. For example, the leaky bucket 206a may be associated with the port queue 204a. The leaky bucket 206a enables enforcement of the traffic profile parameters associated with the egress port by maintaining a token count. For example, when a data packet arrives at the port queue 204a, the switch 202 may determine the token count value associated with the leaky bucket 206a. If the current token count value is less than or equal to a configurable maximum token count value, the data packet may be stored in the port queue 204a to be scheduled for transmission via the egress ports 208a. When a data packet is stored in the port queue 204a, the token count value in the leaky bucket 206a may be increased by a specified number of token. In an exemplary embodiment of the invention, the token count value stored in the leaky bucket 206a may be increased by a specified number of tokens for each data packet that is transmitted from the port queue 204a. The configurable maximum token count value may be specified with a minimum granularity value and with a maximum token count value.

The leaky bucket 206a may also decrease the token count value at a specified rate. This process, referred to as "refresh", may determine how many tokens are to be removed from the token bucket 206a at specified time intervals. In an exemplary embodiment of the invention, the refresh rate may specify the number of tokens to remove from the token bucket 206a for each 1 ms time interval. The refresh rate may be specified with a minimum granularity equal to the number of tokens corresponding to a single data packet. For example, a refresh rate of 1 may correspond to removing a number of tokens corresponding to 1 data packet from the token bucket 206a for each 1 second time interval.

In various embodiments of the invention, the instantaneous data rate at which data packets may be retrieved from the port queue 204a and sent to the egress ports 108a may be determined based on the configurable maximum token count value and the refresh rate parameters associated with the leaky bucket 206a.

The description for the port queues 204b and 204c and leaky buckets 206b and 206c may be substantially similar to the description of port queue 204a and leaky bucket 206a, respectively. Each port queue and leaky bucket may be independently configured.

In various embodiments of the invention, CoS packet shaping, as described in FIG. 1, and egress port packet shaping, as described in FIG. 2, may be performed concurrently within the switch 102 or 202. When CoS and egress port packet shaping are practiced concurrently, a data packet may first be classified based on CoS and subjected to CoS packet shaping as described in FIG. 1. When the data packet is subsequently routed to a specific egress port, the data packet may then be subjected to egress port packet shaping as described in FIG. 2.

Figure 3:
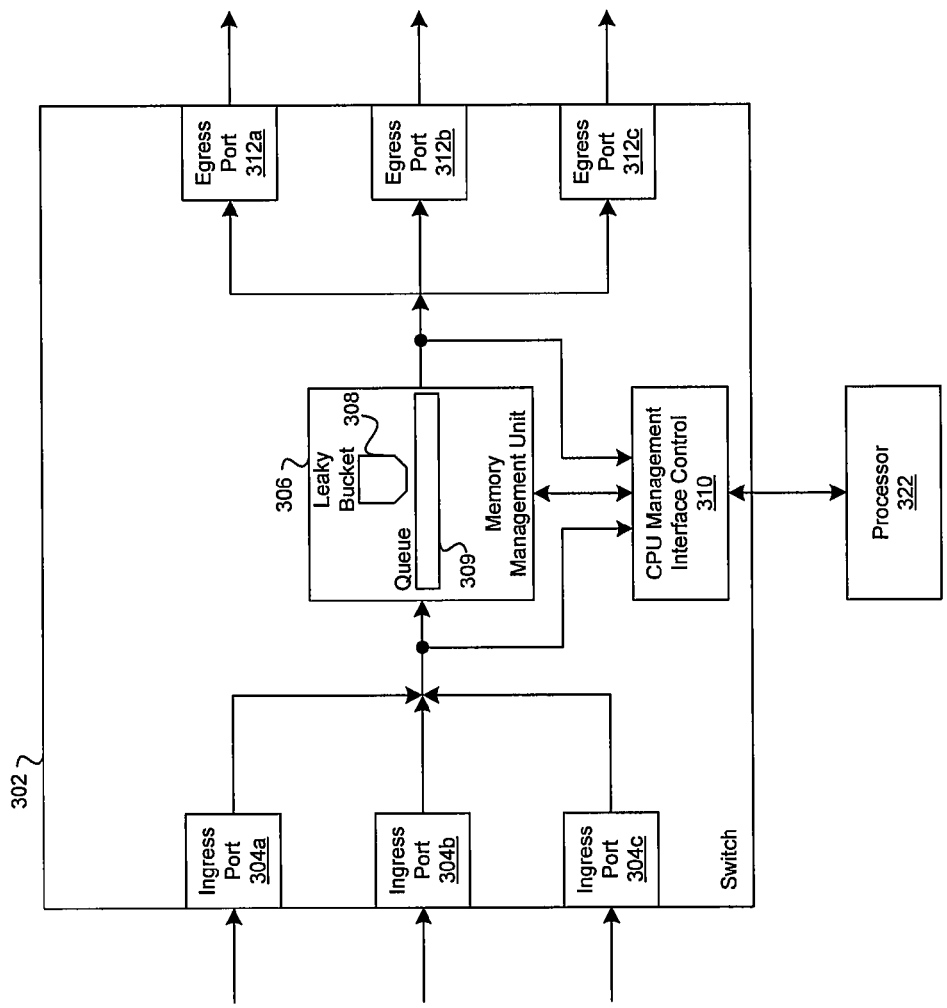
FIG. 3 is a diagram of an exemplary integrated circuit device that implements packet rate shaping, in according with an embodiment of the invention.

FIG. 3 is a diagram of an exemplary integrated circuit device that implements packet rate shaping, in according with an embodiment of the invention. Referring to FIG. 3, there is shown an integrated circuit (IC) device 302, and a processor 322. The processor 322 may also be referred to as a central processing unit (CPU). The IC 302 may implement packet rate shaping based on CoS classification and/or egress port classification. The IC 302 may comprise ingress ports 304a, 304b and 304c, egress ports 312a, 312b and 312c, memory management unit (MMU) 306, and CPU management interface control (CMIC) 310. The MMU 306 may comprise at least one leaky bucket 308, and at least one queue 309.

The MMU 306 may implement CoS traffic shaping, as described in FIG. 1, and/or egress port traffic shaping, as described in FIG. 2. The MMU 306 may comprise a plurality of leaky buckets 308 and a corresponding number of queues 309, which may be utilized for CoS traffic shaping. Similarly, the MMU 306 may comprise a plurality of leaky buckets 308 and a corresponding number of queues 309, which may be utilized for egress port traffic shaping.

The processor 322 may comprise suitable logic, circuitry and/or code that may enable configuration of traffic profile parameters for CoS traffic shaping and/or egress port traffic shaping. Exemplary parameters may comprise maximum token count values, and/or refresh rates for one or more CoS and/or for one or more egress ports.

The CMIC 310 may provide an interface to the IC 302, which enables the processor 322 to configure the MMU 306 to perform CoS traffic shaping and/or egress port traffic shaping. The CMIC 310 may measure aggregate packet transmission rates from the ingress ports 304a, 304b and/or 304c, and to the egress ports 312a, 312b and/or 312c. The CMIC 310 may then send control signals to the MMU 306 and/or feedback information to the processor 322. For example, the CMIC 310 may send control signals, which instruct the MMU 306 to discard a data packet received from an ingress port 304a. The CMIC 310 may then send status information to the processor 322 reporting the data packet discard event. The processor 322 may then enable communicating of a message to the device with originated the packet received via ingress port 304a, for example via egress port 312a, to advice the originating device of the packet discard event.

In operation, once configured with traffic profile parameters, the MMU 306 may receive data packets via any of the ingress ports 304a, 304b and/or 304c. The traffic profile parameters may specify a rate of data transmission for a corresponding service class or egress port in units of packets/second. The MMU 306 may classify the received data packet based on CoS classification and/or egress port classification. The MMU 306 may apply the corresponding traffic shaping policies in according with the applicable traffic profile parameters. The data packet may be scheduled for transmission via one of the egress ports 312a, 312b and/or 312c. The corresponding leaky bucket token count parameters may be updated in response to each data packet receive and/or token bucket refresh event.

Figure 4:
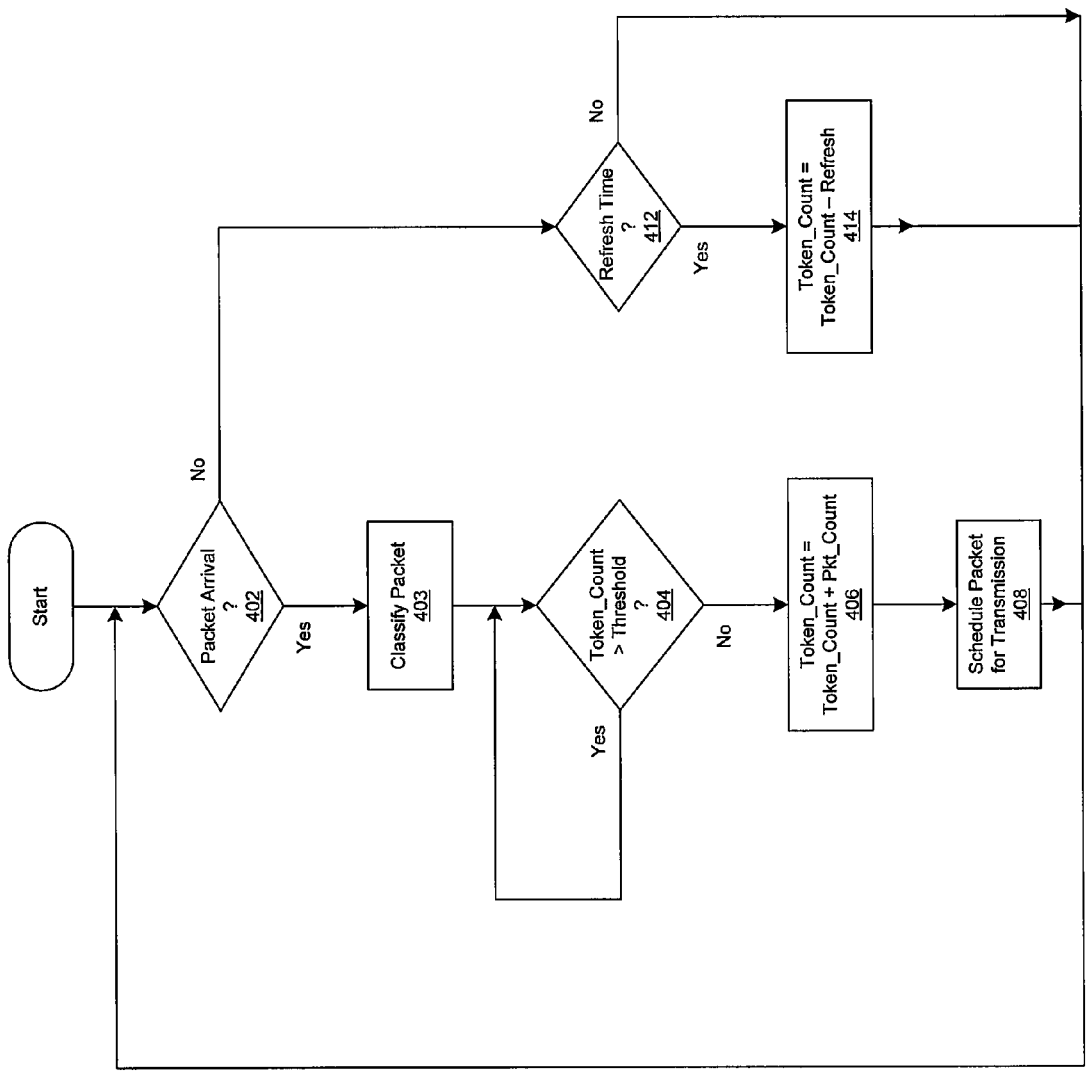
FIG. 4 is a flow chart illustrating exemplary steps for packet rate shaping based on class of service or egress port, in accordance with an embodiment of the invention.

FIG. 4 is a flow chart illustrating exemplary steps for packet rate shaping based on class of service or egress port, in accordance with an embodiment of the invention. The flow chart shown in FIG. 4 may be independently utilized for CoS packet rate shaping and/or for egress port packet rate shaping. Referring to FIG. 4, upon starting of the relevant traffic shaping process, in step 402, a determination may be made as to whether a data packet has arrived via an ingress port, for example via ingress port 304a. If a data packet has arrived, in step 403, the data packet may be classified. The data packet may be classified according to a CoS, or according to a destination egress port.

In step 404, a determination may be made as to whether the token count value, Token_Count, for the leaky bucket 308 associated with the class for the received data packet has exceeded a maximum threshold value. If, in step 404, the token count value is determined to have exceeded the maximum threshold value, step 404 may be repeated. If the token count has not exceeded the maximum threshold value, in step 406, the token count value may be increased by a specified token count value, Pkt_Count. In step 408, the received data packet may be stored in the corresponding queue 309, and scheduled for transmission via the appropriate egress port, for example egress port 312*a*. Step 402 may follow step 408.

If, in step 402, a data packet has not arrived, in step 412, a determination may be made as to whether a token bucket refresh time interval has elapsed. If in step 412 it is determined that the refresh time interval has elapsed, in step 414, the token count value may be decreased by a token bucket refresh value, Refresh. Step 402 may follow step 414. If, in step 412, a token bucket refresh time interval has not elapsed, step 402 may follow step 412.

Aspects of a system for packet rate shaping may comprise an MMU 306 that enables classification of one or more packets based on a CoS and/or an egress port, and transmission of the packets in accordance with a specified packet rate based on the classification. The MMU 306 may enable transmitting the packets when a CoS token bucket, such as leaky bucket 106*a*, has a token count, which is less than or equal to a specified maximum token count value when the packets are classified based on CoS. The token count value may be decreased at a specified refresh rate. The specified packet rate may be determined based on the specified refresh rate. The token count value may represent an integer number of packets. The token count value may be increased by a specified packet increment value for each classified packet.

The MMU 306 may enable transmitting the packets when an egress port token bucket, such as leaky bucket 206*a*, has a token count, which is less than or equal to a specified maximum token count value when the packets are classified based on an egress port. The token count value may be decreased at a specified refresh rate. The specified packet rate may be determined based on the specified refresh rate. The token count value may represent an integer number of packets. The token count value may be increased by a specified packet increment value for each classified packet.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling data transmission in a communication system, the method comprising:
    classifying at least one packet based on a class of service (CoS), and/or an egress port;
    waiting for an opportunity to transmit said at least one packet when a CoS token bucket has a token count value which is greater than a specified maximum token count value; and
    transmitting said at least one packet in accordance with a specified packet rate based on said classifying when said token count value is less than or equal to said specified maximum token count value.

2. The method according to claim 1, comprising transmitting said at least one packet when said CoS token bucket has said token count value which is less than or equal to said specified maximum token count value when said at least one packet is classified based on said CoS.

3. The method according to claim 2, comprising decreasing said token count value at a specified refresh rate.

4. The method according to claim 3, wherein said specified packet rate is determined based on said specified refresh rate.

5. The method according to claim 2, wherein said token count value represents an integer number of packets.

6. The method according to claim 2, comprising increasing said token count value by a specified packet increment value for each said classified said at least one packet.

7. The method according to claim 1, comprising transmitting said at least one packet when an egress port token bucket has a token count value which is less than or equal to a specified maximum token count value when said at least one packet is classified based on said egress port.

8. The method according to claim 7, comprising decreasing said token count value at a specified refresh rate.

9. The method according to claim 8, wherein said specified packet rate is determined based on said specified refresh rate.

10. The method according to claim 7, wherein said token count value represents an integer number of packets.

11. The method according to claim 7, comprising increasing said token count value by a specified packet increment value for each said classified said at least one packet.

12. A non-transitory computer readable medium having stored thereon, a computer program having at least one code section for controlling data transmission in a communication system, the at least one code section being executable by a computer causing the computer to perform steps comprising:
    classifying at least one packet based on a class of service (CoS), and/or an egress port;
    waiting for an opportunity to transmit said at least one packet when a CoS token bucket has a token count value which is greater than a specified maximum token count value; and
    transmitting said at least one packet in accordance with a specified packet rate based on said classifying when said token count value is less than or equal to said specified maximum token count value.

13. The non-transitory computer readable medium according to claim 12, wherein said at least one code section comprises code for transmitting said at least one packet when said CoS token bucket has said token count value which is less than or equal to said specified maximum token count value when said at least one packet is classified based on said CoS.

14. The non-transitory computer readable medium according to claim 13, wherein said at least one code section comprises code for decreasing said token count value at a specified refresh rate.

15. The non-transitory computer readable medium according to claim 14, wherein said specified packet rate is determined based on said specified refresh rate.

16. The non-transitory computer readable medium according to claim 13, wherein said token count value represents an integer number of packets.

17. The non-transitory computer readable medium according to claim 13, wherein said at least one code section comprises code for increasing said token count value by a specified packet increment value for each said classified said at least one packet.

18. The non-transitory computer readable medium according to claim 12, wherein said at least one code section comprises code for transmitting said at least one packet when an egress port token bucket has a token count value which is less than or equal to a specified maximum token count value when said at least one packet is classified based on said egress port.

19. The non-transitory computer readable medium according to claim 18, wherein said at least one code section comprises code for decreasing said token count value at a specified refresh rate.

20. The non-transitory computer readable medium according to claim 19, wherein said specified packet rate is determined based on said specified refresh rate.

21. The non-transitory computer readable medium according to claim 18, wherein said token count value represents an integer number of packets.

22. The non-transitory computer readable medium according to claim 18, wherein said at least one code section comprises code for increasing said token count value by a specified packet increment value for each said classified said at least one packet.

23. A system for controlling data transmission in a communication system, the system comprising:
at least one circuit that enables classification of at least one packet based on a class of service (CoS), and/or an egress port;
said at least one circuit enables waiting for an opportunity to transmit said at least one packet when a CoS token bucket has a token count value which is greater than a specified maximum token count value; and
said at least one circuit enables transmission of said at least one packet in accordance with a specified packet rate based on said classification when said token count value is less than or equal to said specified maximum token count value.

24. The system according to claim 23, wherein said at least one circuit enables transmission of said at least one packet when said CoS token bucket has said token count value which is less than or equal to said specified maximum token count value when said at least one packet is classified based on said CoS.

25. The system according to claim 24, wherein said at least one circuit enables decreasing of said token count value at a specified refresh rate.

26. The system according to claim 25, wherein said specified packet rate is determined based on said specified refresh rate.

27. The system according to claim 24, wherein said token count value represents an integer number of packets.

28. The system according to claim 24, wherein said at least one circuit enables increasing of said token count value by a specified packet increment value for each said classified said at least one packet.

29. The system according to claim 23, wherein said at least one circuit enables transmission of said at least one packet when an egress port token bucket has a token count value which is less than or equal to a specified maximum token count value when said at least one packet is classified based on said egress port.

30. The system according to claim 29, wherein said at least one circuit enables decreasing of said token count value at a specified refresh rate.

31. The system according to claim 30, wherein said specified packet rate is determined based on said specified refresh rate.

32. The system according to claim 29, wherein said token count value represents an integer number of packets.

33. The system according to claim 29, wherein said at least one circuit enables increasing of said token count value by a specified packet increment value for each said classified said at least one packet.

* * * * *